(12) United States Patent
Urban et al.

(10) Patent No.: US 11,245,905 B2
(45) Date of Patent: Feb. 8, 2022

(54) METHOD AND APPARATUS FOR BLENDED INTRA PREDICTION

(71) Applicant: InterDigital VC Holdings, Inc., Wilmington, DE (US)

(72) Inventors: Fabrice Urban, Cesson-Sevigne (FR); Franck Galpin, Cesson-Sevigne (FR); Fabien Racape, Palo Alto, CA (US); Gagan Bihari Rath, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/040,965

(22) PCT Filed: Apr. 29, 2019

(86) PCT No.: PCT/US2019/029727
§ 371 (c)(1),
(2) Date: Sep. 23, 2020

(87) PCT Pub. No.: WO2019/217122
PCT Pub. Date: Nov. 14, 2019

(65) Prior Publication Data
US 2021/0105478 A1  Apr. 8, 2021

(30) Foreign Application Priority Data

May 9, 2018 (EP) ........................................ 8305572

(51) Int. Cl.
*H04N 19/129* (2014.01)
*H04N 19/119* (2014.01)
(Continued)

(52) U.S. Cl.
CPC ......... *H04N 19/129* (2014.11); *H04N 19/119* (2014.11); *H04N 19/176* (2014.11); *H04N 19/593* (2014.11)

(58) Field of Classification Search
None
See application file for complete search history.

(56) References Cited

U.S. PATENT DOCUMENTS

| 8,462,846 B2 | 6/2013 | Zhang | |
| 2013/0301717 A1* | 11/2013 | Kim | ........................ H04N 19/50 375/240.12 |
| 2019/0149828 A1* | 5/2019 | Jeong | ................... H04N 19/176 375/240.12 |

OTHER PUBLICATIONS

Chen, et al., "A new hybrid fast mode decision method for H. 264/AVC intra coding", Proceedings of the 2013 International Conference on Machine Learning and Cybernetics, vol. 2. IEEE, pp. 861-864, Tianjin, Jul. 14-17, 2013.

(Continued)

*Primary Examiner* — Kate H Luo
(74) *Attorney, Agent, or Firm* — Xiaoan Lu

(57) ABSTRACT

Methods and apparatuses for intra prediction in video encoding and decoding using a blended intra predictor are described. In one exemplary embodiment, intra prediction is preformed using a blended intra predictor for a pixel of a current block being encoded and decoded. The blended intra predictor is determined by summing with corresponding weights a predictor using the intra prediction direction to be used for the current block and one or more predictors using the one or more corresponding intra prediction directions of the one or more neighboring blocks. The corresponding weights for the one or more neighboring blocks decrease with increased distance of the pixel to the one or more neighboring blocks.

20 Claims, 17 Drawing Sheets

(51) Int. Cl.
H04N 19/176 (2014.01)
H04N 19/593 (2014.01)

(56) References Cited

OTHER PUBLICATIONS

ITU-T "Video Coding For Low-Bit-Rate Communication", ITU-T, Draft H.263, Line Transmission of Non-Telephone Signals, pp. 1-54, May 2, 1996.

ITU-T "High efficiency video coding", Series H: Audiovisual and Multimedia Systems, Infrastructure of audiovisual services—Coding of moving video, Recommendation ITU-T H.265, pp. 1-540, Oct. 2014.

Zhang et al.,"TE6.a: Overlapped Block Inta Predication", Joint Collaborative Team on Video Coding (JCT-VC) of ITU-T SG16 WP3 and ISO/IEC JTC1/SC29/WG11, Document: JCTVC-C193, pp. 1-5, 3rd Meeting: Guangzhou, CN, Oct. 7-15, 2010.

Lee et al., "Intra-Mixture Prediction Mode and Enhanced Most Probable Mode Estimation for Intra Coding", ETRI Journal, vol. 31, No. 5, Oct. 2009 pp. 1-3.

Luo et al., "Fast intra-Prediction Mode Selection Method for H.264 Video Coding", 2010 International Conference on Intelligent System Design and Engineering Application, vol. 1, pp. 721-724, 2010.

Kim et al., "Fast Intra Mode Decision Algorithm using the Sum of Absolute Transformed Differences", 2011 International Conference on Digital Image Computing: Techniques and Applications, pp. 1-5, IEEE, 2011.

ITU-T, "Advanced video coding for generic audiovisual services", ITU-T, Series H: Audiovisual and Multimedia Systems, Infrastructure of audiovisual service—Coding of moving video, Recommendation ITU-T H. 264, pp. 1-790, Feb. 2014.

Seregin et al., "Neighbor based intra most probable modes list derivation", Joint Video Exploration Team (JVET) of ITU-T SG 16 WP 3 and ISO/IEC JTC 1/SC 29/WG 11, Document: JVET-C0055, 3rd Meeting: Geneva, CH, pp. 1-4, May 26-Jun. 1, 2016.

Chen et al., "Further improvements to HMKTA-1.0", ITU-Telecommunications Standardization Sector, Study Group 16, Question 6 Video Coding Experts Group (VCEG), Document: VCEG-AZ07_v2, 52nd Meeting: Warsaw, Poland, pp. 1-8,Jun. 19-26, 2015.

Zhang et al., "Enhanced intra prediction and transform for video coding", 2010 IEEE International Conference on Image Processing, IEEE, pp. 3381-3384, 2010.

* cited by examiner

METHOD AND APPARATUS FOR BLENDED INTRA PREDICTION

This application claims the benefit, under 35 U.S.C. § 371 of International Application No. PCT/US2019/029727, filed Apr. 29, 2019, which was published on Nov. 14, 2019, which claims the benefit of European Patent Application No. EP18305572.2 filed May 9, 2018.

TECHNICAL FIELD

At least one of the present embodiments generally relates to a method or an apparatus for video encoding and decoding, and more particularly, to a method or an apparatus for performing intra prediction using a blended intra predictor for a pixel of a current block being encoded and decoded. The blended intra predictor is determined by summing with corresponding weights, a predictor using the intra prediction direction to be used for the current block and one or more predictors using the one or more corresponding intra prediction directions of the one or more neighboring blocks.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors or prediction residuals, are transformed, quantized and entropy coded. To reconstruct the video, the compressed data are decoded by inverse processes corresponding to the prediction, transform, quantization and entropy coding.

Intra prediction in video compression refers to the spatial prediction of a block of pixels using information from causal neighbor blocks, that is, neighboring blocks in the same frame which have already been encoded or decoded. Intra prediction is a powerful coding tool since it allows for high compression efficiency in intra frames, as well as in inter frames. Therefore, intra prediction has been included as a core coding tool in many video compression standards including, but not limited to, H.264/AVC (Advanced Video Coding), H.265/HEVC (High Efficiency Video Coding), and H.266 being developed by the JVET (Joint Video Exploration Team).

SUMMARY

According to a general aspect of at least one embodiment, a method for encoding video data is presented, comprising: obtaining an intra prediction direction to be used for a current block to be encoded; obtaining one or more corresponding intra prediction directions of one or more neighboring blocks of the current block; obtaining a weighted sum for a blended intra predictor of a pixel of the current block, wherein the weighted sum is obtained by summing with corresponding weights a predictor using the intra prediction direction to be used for the current block and one or more predictors using the one or more corresponding intra prediction directions of the one or more neighboring blocks, and the corresponding weights for the one or more neighboring blocks decrease with increased distance of the pixel to the one or more neighboring blocks; and encoding the current block using the blended intra predictor having the weighted sum.

According to another general aspect of at least one embodiment, a method for decoding video data is presented, comprising: obtaining an intra prediction direction to be used for a current block to be decoded; obtaining one or more corresponding intra prediction directions of one or more neighboring blocks of the current block; obtaining a weighted sum for a blended intra predictor of a pixel of the current block, wherein the weighted sum is obtained by summing with corresponding weights a predictor using the intra prediction direction to be used for the current block and one or more predictors using the one or more corresponding intra prediction directions of the one or more neighboring blocks, and the corresponding weights for the one or more neighboring blocks decrease with increased distance of the pixel to the one or more neighboring blocks; and decoding the current block using the blended intra predictor having the weighted sum.

According to another general aspect of at least one embodiment, an apparatus for encoding video data is presented, comprising at least a memory and one or more processors, wherein the one or more processors are configured to: obtain an intra prediction direction to be used for a current block to be encoded; obtain one or more corresponding intra prediction directions of one or more neighboring blocks of the current block; obtain a weighted sum for a blended intra predictor of a pixel of the current block, wherein the weighted sum is obtained by summing with corresponding weights a predictor using the intra prediction direction to be used for the current block and one or more predictors using the one or more corresponding intra prediction directions of the one or more neighboring blocks, and the corresponding weights for the one or more neighboring blocks decrease with increased distance of the pixel to the one or more neighboring blocks; and encode the current block using the blended intra predictor having the weighted sum.

According to another general aspect of at least one embodiment, an apparatus for decoding video data, comprising at least a memory and one or more processors, wherein the one or more processors are configured to: obtain an intra prediction direction to be used for a current block to be decoded; obtain one or more corresponding intra prediction directions of one or more neighboring blocks of the current block; obtain a weighted sum for a blended intra predictor of a pixel of the current block, wherein the weighted sum is obtained by summing with corresponding weights a predictor using the intra prediction direction to be used for the current block and one or more predictors using the one or more corresponding intra prediction directions of the one or more neighboring blocks, and the corresponding weights for the one or more neighboring blocks decrease with increased distance of the pixel to the one or more neighboring blocks; and decode the current block using the blended intra predictor having the weighted sum.

According to another general aspect of at least one embodiment, a bitstream is formatted to include an encoded block of video data, wherein the encoded block of video data is encoded by: obtaining an intra prediction direction to be used for a block of video data to be encoded; obtaining one or more corresponding intra prediction directions of one or more neighboring blocks of the block of video data; obtaining a weighted sum for a blended intra predictor of a pixel of the block of video data, wherein the weighted sum is obtained by summing with corresponding weights a predictor using the intra prediction direction to be used for the block of video data and one or more predictors using the one or more corresponding intra prediction directions of the one or more neighboring blocks, and the corresponding weights for the one or more neighboring blocks decrease with increased distance of the pixel to the one or more neighboring blocks; and encoding the block of video data using the blended intra predictor having the weighted sum.

One or more of the present embodiments also provide a computer readable storage medium having stored thereon instructions for encoding or decoding video data according to the methods described above. The present embodiments also provide a computer readable storage medium having stored thereon a bitstream generated according to the methods described above. The present embodiments also provide methods and apparatuses for transmitting or receiving the bitstream generated according to the methods described above.

DETAILED DESCRIPTION

Figure 1:
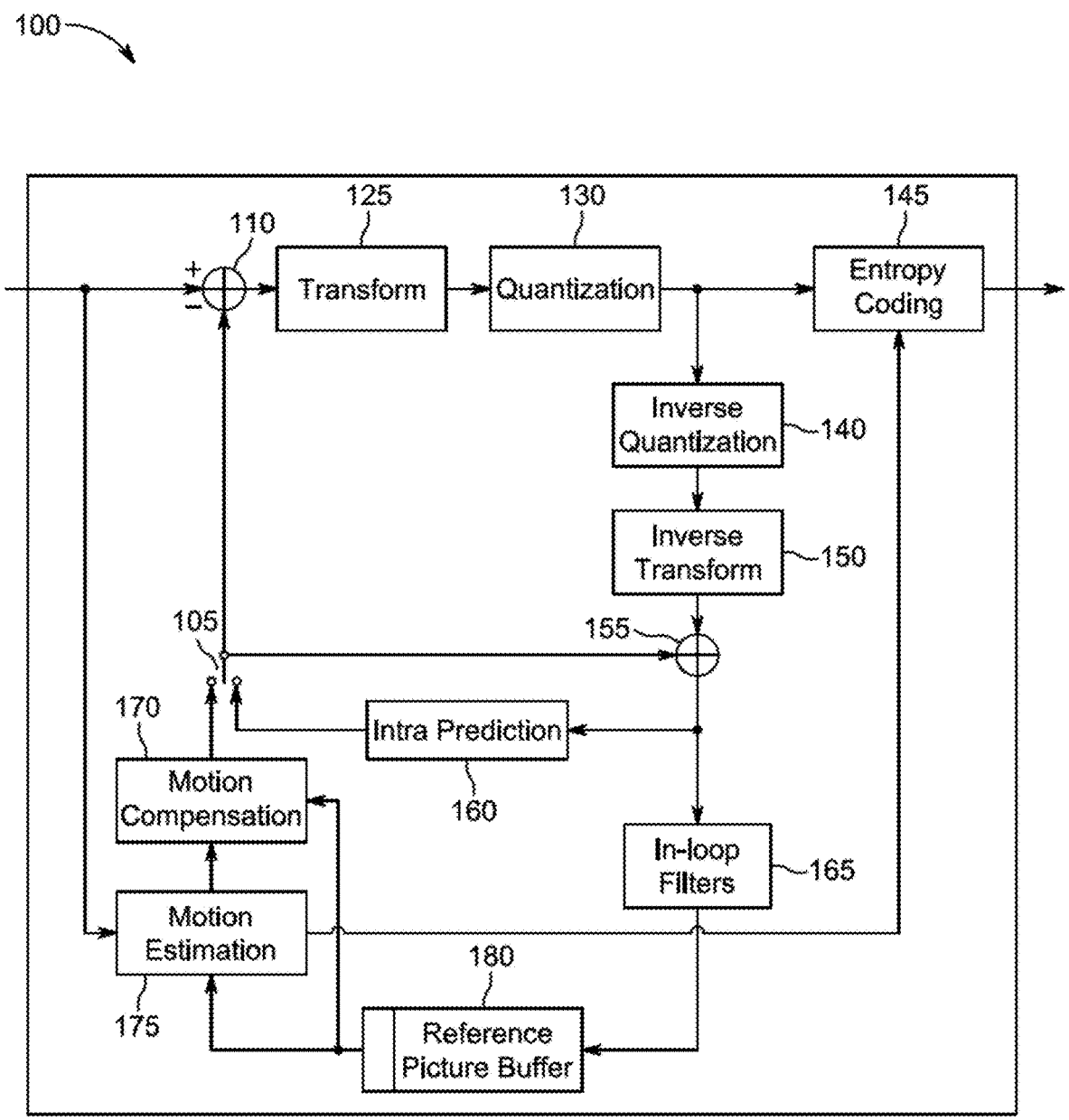
FIG. 1 illustrates a block diagram of an exemplary video encoder.

FIG. 1 illustrates an exemplary video encoder 100, such as an HEVC encoder. HEVC is a compression standard developed by Joint Collaborative Team on Video Coding (JCT-VC) (see, e.g., "ITU-T H.265 TELECOMMUNICATION STANDARDIZATION SECTOR OF ITU (October 2014), SERIES H: AUDIOVISUAL AND MULTIMEDIA SYSTEMS, Infrastructure of audiovisual services—Coding of moving video, High efficiency video coding, Recommendation ITU-T H.265"). FIG. 1 may also illustrate an encoder in which improvements are made to the HEVC standard or an encoder employing technologies similar to HEVC, such as an encoder based on or improved upon JEM (Joint Exploration Model) under development by JVET.

In the present application, the terms "reconstructed" and "decoded" may be used interchangeably, the terms "pixel" and "sample" may be used interchangeably, and the terms "picture" and "frame" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC or other video coding standards, and more generally to refer to an array of data of various sizes.

In the exemplary encoder 100 in FIG. 1, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 3:
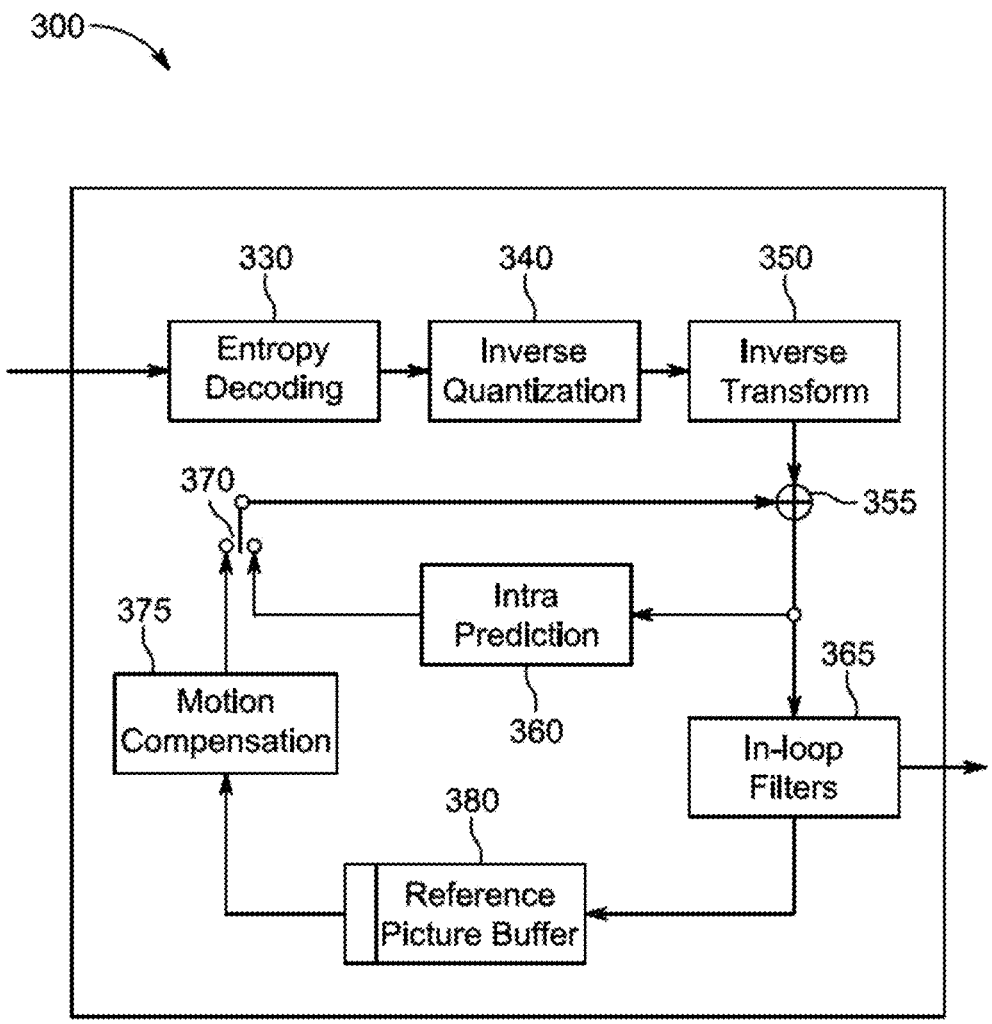
FIG. 3 illustrates a block diagram of an exemplary video decoder.

FIG. 3 illustrates a block diagram of an exemplary video decoder 300, such as an HEVC decoder. In the exemplary decoder 300, a bitstream is decoded by the decoder elements as described below. Video decoder 300 generally performs a decoding pass reciprocal to the encoding pass as described in FIG. 1, which performs video decoding as part of encoding video data. FIG. 3 may also illustrate a decoder in which improvements are made to the HEVC standard or a decoder employing technologies similar to HEVC, such as a decoder based on or improved upon JEM.

In particular, the input of the decoder includes a video bitstream, which may be generated by video encoder 100. The bitstream is first entropy decoded (330) to obtain transform coefficients, motion vectors, and other coded information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). Advanced Motion Vector Prediction (AMVP) and merge mode techniques may be used to derive motion vectors for motion compensation, which may use interpolation filters to calculate interpolated values for sub-integer samples of a reference block. In-loop filters (365) are applied to the reconstructed image. The filtered image is stored at a reference picture buffer (380).

In order to exploit the spatial redundancy, CUs in intra mode are predicted from reconstructed neighboring samples within the same slice. The causal neighboring CUs have already been encoded/decoded when the encoding/decoding of the current CU is considered. To avoid mismatch, the encoder and the decoder have the same prediction. Therefore, both the encoder and the decoder use the information from the reconstructed/decoded neighboring causal CUs to form prediction for the current CU.

Figure 2A:
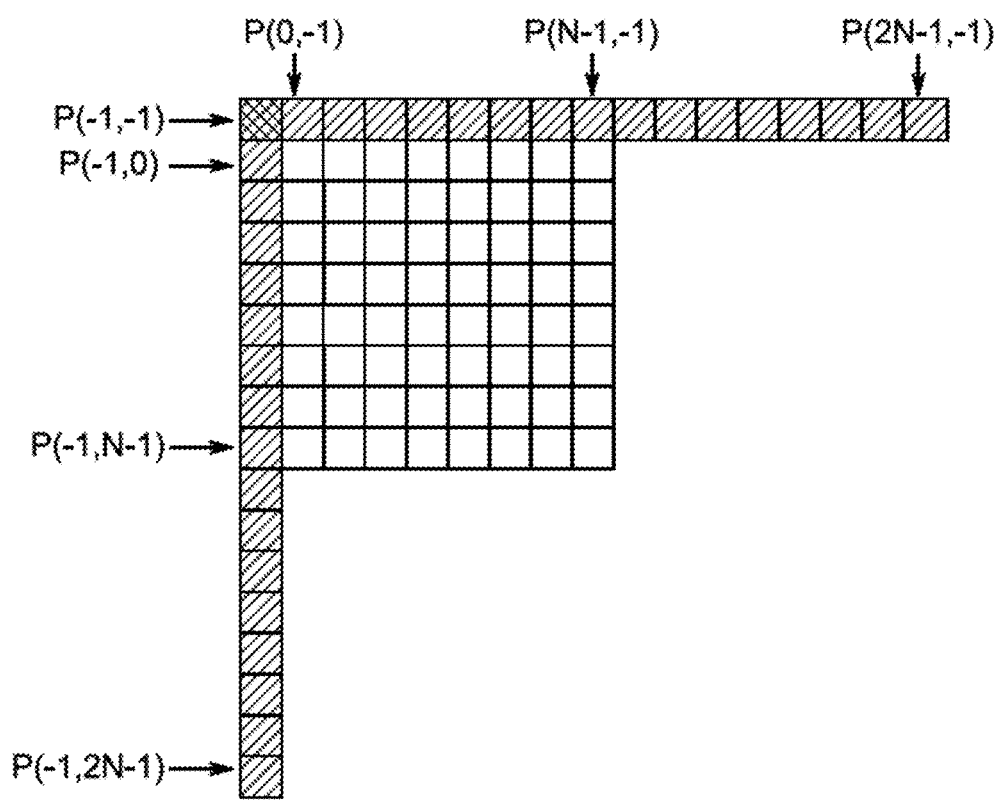
FIG. 2A is a pictorial example depicting the reference samples for intra prediction in HEVC.

The intra prediction process in HEVC includes three steps: (1) reference sample generation, (2) intra sample prediction, and (3) post-processing of predicted samples. Exemplary HEVC reference samples for intra prediction are illustrated in FIG. 2A, where the reference sample candidates are the row on the top (shaded) and the column on the left (also shaded) of a target block (unshaded). The pixel values at coordinate (x, y) are indicated in FIG. 2A by P(x, y). For a CU of size N×N, a row of 2N decoded samples on the top is formed from the decoded CUs. Similarly, a column of 2N samples on the left is formed from the decoded CUs. The corner pixel from the above-left decoded CU is used to fill up the gap between the above row and the left column references. If some of the samples are not available, for example, when the corresponding CUs are not in the same slice or the current CU is at a frame boundary, then reference sample substitution is performed where the missing samples are copied from the available samples in a clock-wise direction. Then, depending on the current CU size and the prediction mode, the reference samples are filtered using a specified filter.

Figure 2B:
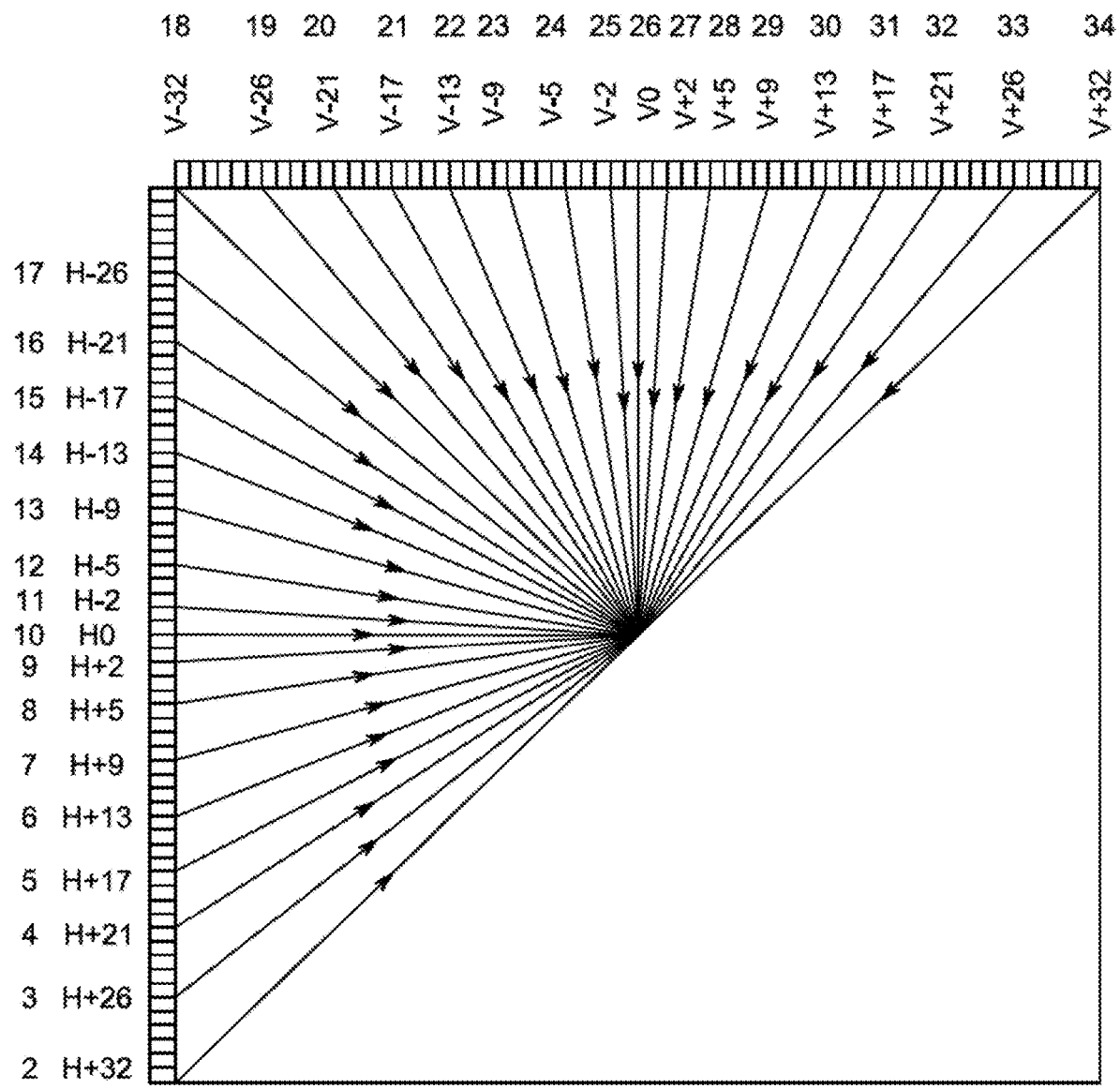
FIG. 2B is a pictorial example depicting intra prediction directions and the corresponding modes in HEVC.

The next step, i.e., the intra sample prediction, consists of predicting the pixels of the target CU based on the reference samples. In order to predict different kinds of content efficiently, HEVC supports a range of prediction modes. In particular, planar and DC prediction modes are used to predict smooth and gradually changing regions, whereas directional prediction modes (also referred to as "angular prediction modes") are used to capture different directional structures. HEVC supports 33 directional prediction modes which are indexed from 2 to 34. These prediction modes correspond to different prediction directions as illustrated in FIG. 2B, wherein the numbers (i.e., 2, 3, . . . , 34) denote intra prediction mode indices.

Figure 2C:
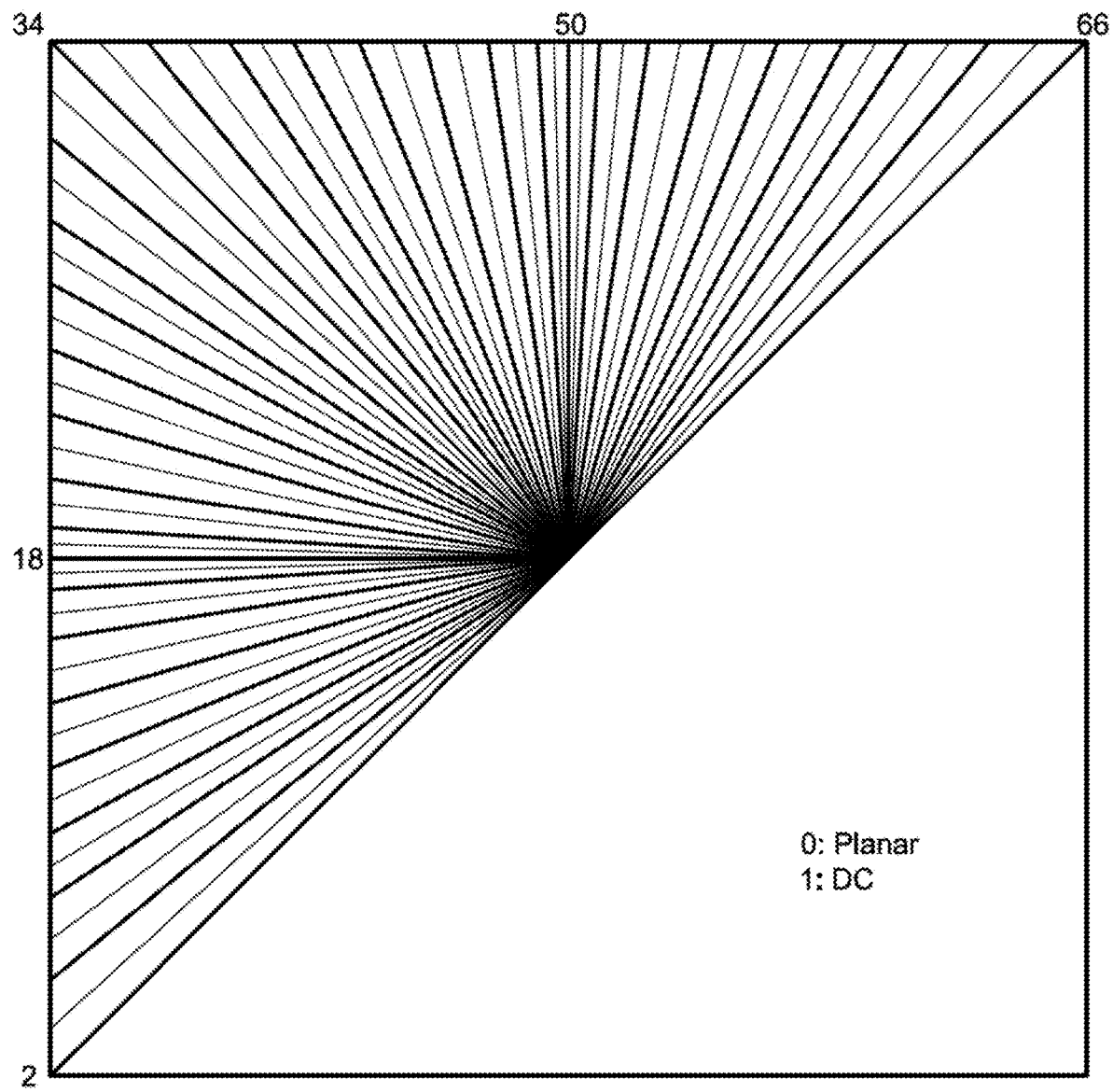
FIG. 2C is a pictorial example depicting intra prediction directions and the corresponding modes in JEM (Joint Exploration Model) under development by JVET.

In JEM, current proposals increase the number of the intra prediction modes compared with HEVC. For example, as shown in FIG. 2C, JEM 3.0 uses 65 directional intra prediction modes in addition to the planar mode 0 and the DC mode 1. The directional intra prediction modes are numbered from 2 to 66 in the increasing order, in the same fashion as done in HEVC from 2 to 34 as shown in FIG. 2B. The 65 directional prediction modes include the 33 directional prediction modes specified in HEVC plus 32 additional directional prediction modes that correspond to angles in-between two original angles. In other words, the prediction direction in JEM has twice the angle resolution of HEVC. Higher number of prediction modes have been proposed to exploit the possibility of finer angular structures with proposed larger block sizes.

Since there are multiple intra prediction modes available, the decoder needs the mode information to form the prediction for an intra-coded CU. In HEVC, the applicable luma intra prediction mode for the current block may be coded using two different options. If the applicable mode is included in the constructed list of three most probable modes (MPM), the mode is signaled by an index in the MPM list. Otherwise, the mode is signaled by a fixed-length binarization of the mode index.

Figure 4:
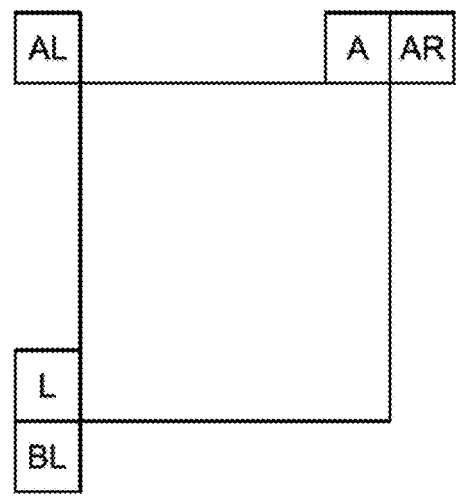
FIG. 4 illustrates pictorially the five possible neighboring candidates used in JEM for most probable mode (MPM) encoding and decoding.

In JEM, the MPM method is based on an algorithm in which 5 neighboring candidate locations are considered, i.e., left (L), above (A), below left (BL), above right (AR), and above left (AL), as shown in FIG. 4.

Some of the prediction modes such as the DC mode and directly horizontal (i.e., mode 10 in HEVC, mode 18 in JEM, also denoted as "HOR") and directly vertical modes (i.e., mode 26 in HEVC, mode 50 in JEM, also denoted as "VER") may cause discontinuity at the CU boundaries of the prediction samples. Therefore, in HEVC, as well as in JEM, such prediction modes are followed by a post-processing step where the boundary of the predicted samples are smoothed using a low-pass filter. Here, directly horizontal mode refers to the prediction mode when the reference samples on the left side of a target block are repeated horizontally to the right for intra prediction. Similarly, directly vertical mode refers to the prediction mode when the reference samples on the top of a target block are repeated vertically down for intra prediction.

Aspects of the present exemplary embodiments relate to improving intra prediction for video encoding and decoding. For example, present embodiments extend the intra prediction beyond the borders of the current block, to smooth the transition between blocks having different directions of prediction. It is proposed to create a hybrid mode that blends a prediction using a direction for the current block as well as predictions using the directions used by neighboring blocks. Present embodiments improve the intra prediction efficiency for blocks whose causal neighbors bring complementary information, by combining the modes of those neighbors to the current mode. Present embodiments aim at reducing prediction discontinuities at block boundaries. It is noted that block boundary discontinuity is currently addressed in JEM by intra block boundary filters as mentioned before, but JEM does not consider the directions of prediction of the neighboring blocks.

Figure 5:
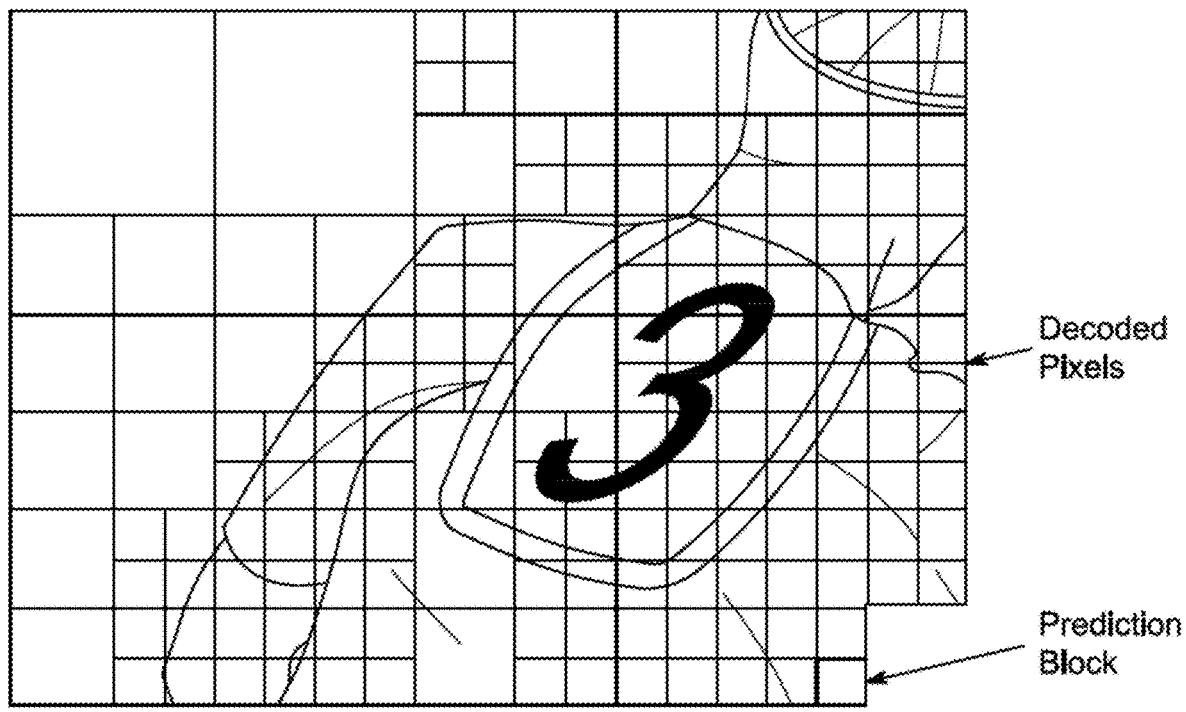
FIG. 5 illustrates use of a prediction block for intra prediction of a picture.

In existing codecs, intra prediction aims at constructing a first version of the current block, called predictor, which minimizes the energy of the residual signal to be transmitted in the bitstream as depicted in FIG. 5. The residuals are transformed in frequency domain, then quantized and encoded. Hence, the goal is usually not to provide the best visually satisfying predictor but a construction using available samples that minimizes the cost of the encoded or transmitted data.

In the case of a block located at the border of an object, over curvy edges or changing textures, for example, the encoder may have, e.g., the following options:
use a best matching directional mode,
use DC or Planar, or
when possible, split the block so that smaller sub-blocks are better predicted, at the cost of more syntax elements.

Figure 6:
FIG. 6 illustrates how a picture may be sub-divided into smaller coding blocks of varying sizes depending on the picture content.

For example, a curvy border of an object will make the encoder choose smaller blocks along the edge, so that straight directional modes can approximate the shape, as illustrated in FIG. 6. Therefore, curvy edges as well as changing textures are mostly encoded with small blocks. However, existing directional modes consist in propagating or copying reference samples in a fixed direction. Consequently, for example, curves are predicted by multiple straight lines. The prediction is thus generally not too efficient.

Figure 7:
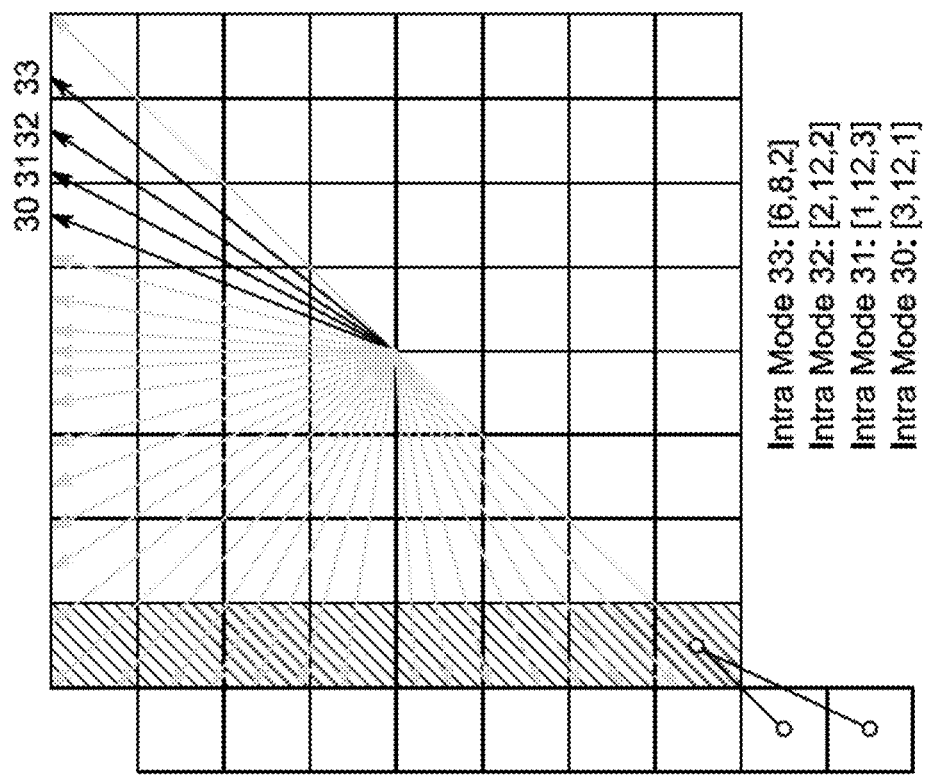
FIG. 7 illustrates pictorially the boundary prediction filters for intra mode 34 and 30-33 in HEVC.
Figure 7:
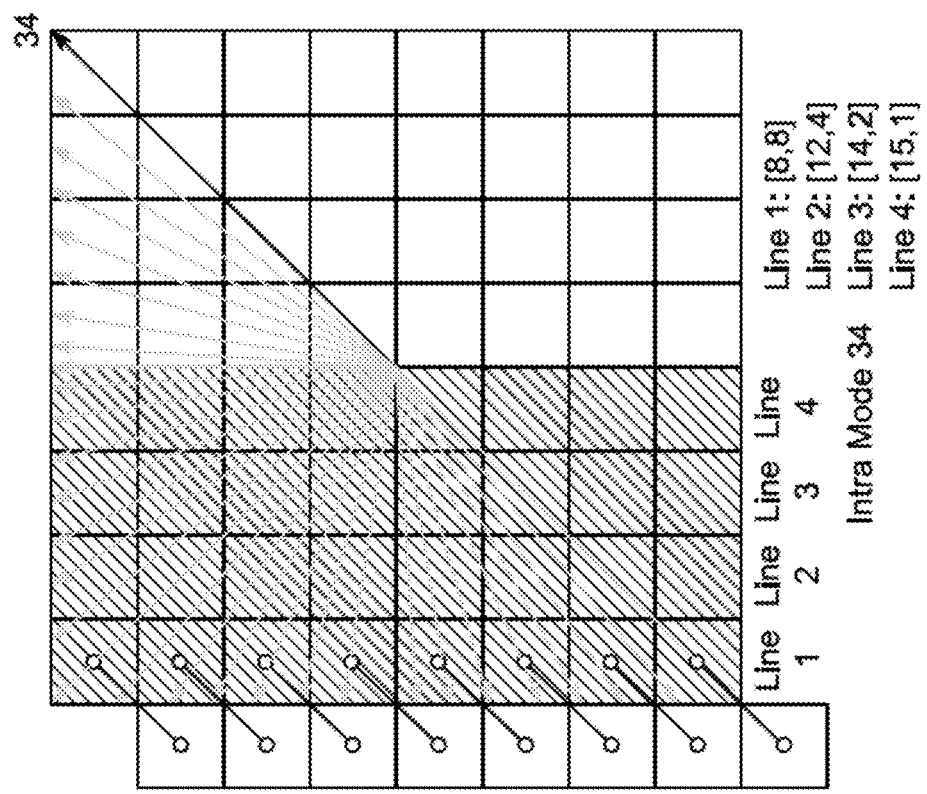

As noted before, for some directions of intra prediction, to smooth prediction discontinuities at block boundaries, a filter is applied along the edge that was not used for prediction. In HEVC, after the intra prediction block has been generated for VER and HOR intra modes, the left-most column and top-most row of the prediction samples are further adjusted, respectively. This method has been further extended in the JEM to several diagonal intra modes, and boundary samples up to four columns or rows are further adjusted using a two-tap (for intra mode 2 & 34) or a three-tap filter (for intra mode 3-6 & 30-33). Examples of the boundary prediction filters for intra modes 34 and 30-33 are shown in FIG. 7, and the boundary prediction filters for intra modes 2 and 3-6 are similar but not shown. It should be noted that in FIG. 7, the filtering is shown for HEVC modes. In the later version of JEM, the method is extended to 67 modes as noted before.

Figure 8:
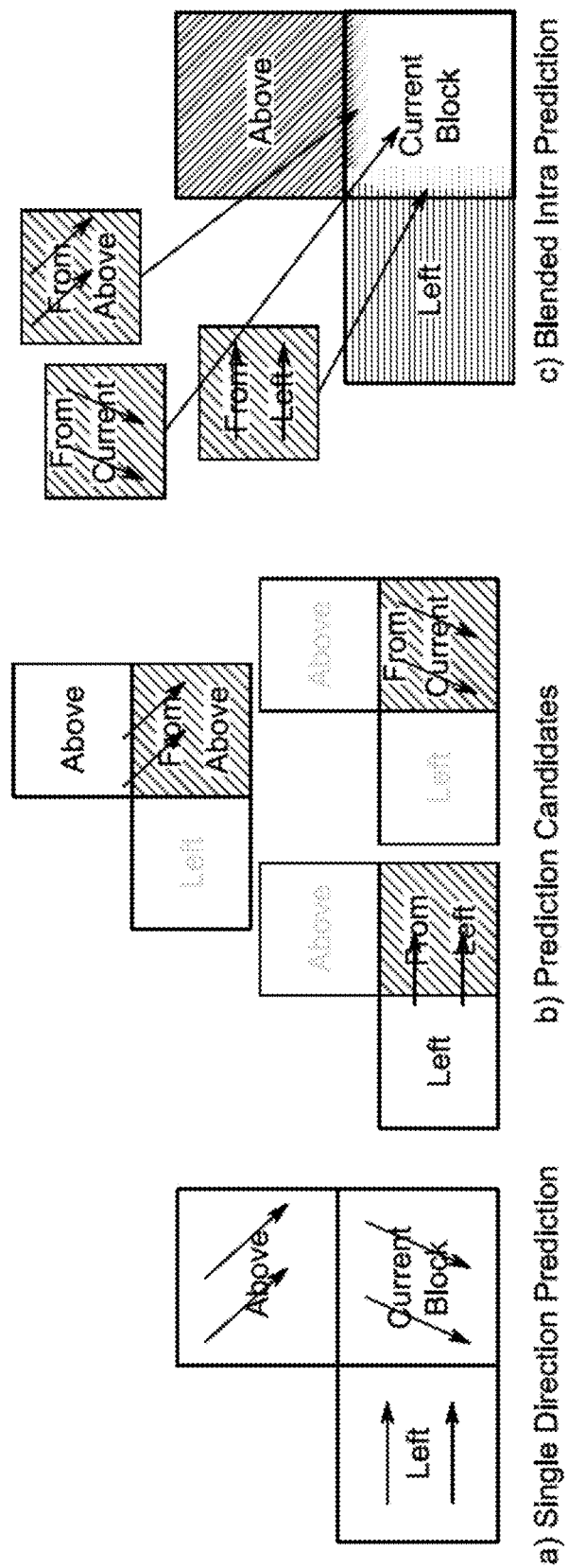
FIG. 8 illustrates conceptually and pictorially blended intra prediction using current and neighboring predictors and their corresponding directions.

In order to better predict varying spatial directions of objects and textures and to smooth the transition between blocks having different directions of prediction, present embodiments use blended intra prediction to derive a blended intra predictor for the current block being coded or decoded. This concept is illustrated pictorially in FIG. 8. Blended intra prediction extends the intra prediction beyond the border of the block, to create a hybrid mode that blends a prediction from a direction for the current block in the classical sense (e.g., as used in H.264 or HEVC and as shown in a) of FIG. 8), with predictions from the directions used by neighboring blocks (as shown in, e.g., b) of FIG. 8). The directions of prediction of neighboring blocks are used to create several prediction candidates, that are then combined with the classical current block prediction using a weighted sum that favors a given prediction for pixels closer to the given related neighbor (as shown in, e.g., c) of FIG. 8).

According to aspects of the present embodiments, to construct the present intra prediction, the intra prediction directions of the already coded or decoded neighboring blocks are used to generate temporary predictions. A classical prediction of the current block with an encoded or decoded mode is also computed as a temporary prediction. Then, these temporary predictions are combined as a weighted sum so that the corresponding weight used for a prediction decreases with increased distance of the pixel of the current block being coded or decoded to the corresponding neighboring block, and the sum of the weights being equal to 1. The present embodiments thus ensure the generation of a smooth transition between blocks, and give more importance to the classical prediction when the pixel is further from already coded or decoded neighbors.

In one embodiment, for a current block of size W×H the following are to be performed:
identify relevant neighbor positions such as for MPM derivation (as shown in, e.g., FIG. 4),
compute one prediction $P_n$ per neighbor $n \in \{\text{left, above, right, below}\}$ being already encoded/decoded and having an intra prediction, where computing the prediction means classical prediction for the current block, but with the prediction direction used/encoded for block n,
compute the classical prediction $P_c$ for the current block with prediction direction coded for the current block,
compute the final prediction $P_{final}$ by combining the predictions as:

$$P_{final}(x,y) = w_c(x,y) \times P_c(x,y) + \Sigma_{n \in \{left, above \ldots\}} w_n(x,y) \times P_n(x,y) \quad (1)$$

with $w_i$ being the weight, $i \in \{c, \text{left, above, right, below}\}$, $w_i = w_c$ for the current block, i=current, $w_i (i \neq c)$ depends on the distance of the pixel at coordinates (x, y) (with (0,0) being the top left pixel of the current block) to the neighbor i, and $\Sigma_i w_i(x, y) = 1$ applied to prediction $P_i$:

$$\circ w_i(x, y) = \max\left(\frac{1}{2} - \frac{2x}{W}, 0\right) \text{ for } i = \text{left},$$
where W is the width of the current block $$\circ w_i(x, y) = \max\left(\frac{1}{2} - \frac{2y}{W}, 0\right) \text{ for } i = \text{above},$$
where H is the height of the current block $$\circ w_i(x, y) = \max\left(\frac{1}{2} - \frac{W-1-2x}{W}, 0\right) \text{ for } i = \text{right}$$

$$\circ w_i(x, y) = \max\left(\frac{1}{2} - \frac{H-1-2y}{H}, 0\right) \text{ for } i = \text{below}$$

$$\circ w_c(x, y) = \sum_{i \neq c} w_i(x, y) \text{ for the current block prediction}$$

Figure 9A:
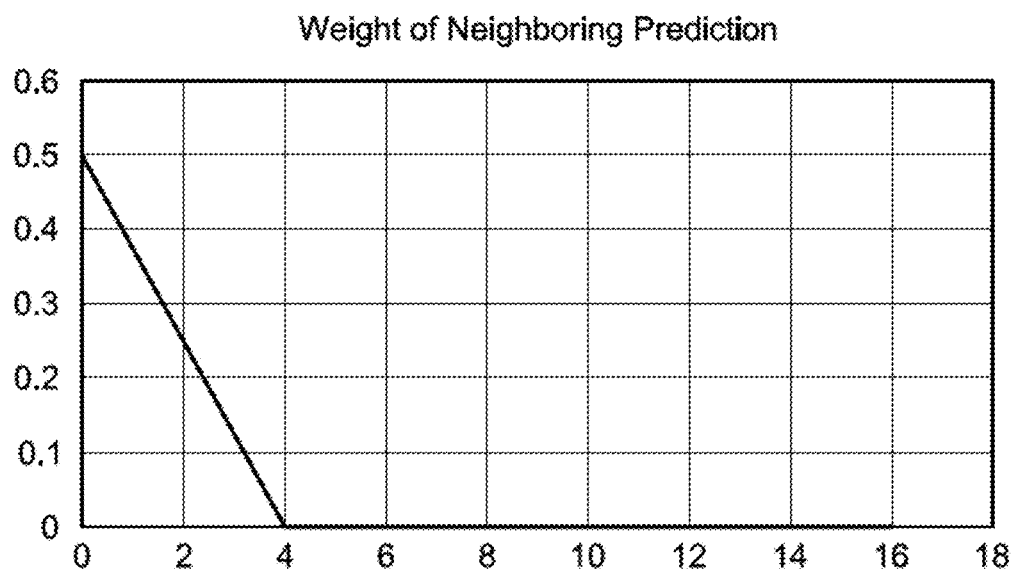
FIG. 9A illustrates pictorially a graph of the weighting values (on Y axis) vs. pixel distance to a corresponding neighboring candidate in units of number of pixels (on X axis), according to an exemplary embodiment.

FIG. 9A illustrates pictorially the graph of the weighting values (on Y axis) vs. pixel distance to the corresponding neighbor candidate in units of number of pixels (on X axis)

based on the above weighting calculations, for $w_{left}(x, y)$ and W=16. Here four neighbors are used. It should be noted that a different set of neighbor positions can be used, and also more or fewer neighbors can be used.

Note that the weighting may be implemented with fixed point arithmetic, for example, by multiplying all the $w_i$ by $M=2^m$ (e.g., m=5) and dividing the result by M, where the division operation can be implemented by a right shift:

$$P_{final} = \frac{1}{M} \times \sum_{(x,y) \in block} \left( M \times w_c(x, y) \times P_c(x, y) + \sum_n M \times w_n(x, y) \times P_n(x, y) \right)$$

With these equations, the width of the combination zone (where $w_i > 0$) depends on the block size: 1 pixel for size 4, 2 pixels for size 8, and etc.

In another non-limiting exemplary embodiment, another set of weighting calculation may be calculated as follows:

$$\circ\ w_i(x, y) = \frac{W}{W + 4 * x} \text{ with } w_c(x, y) = 1 - \sum_{i \neq c} w_i(x, y)$$

for the current block prediction.

Figure 9B:
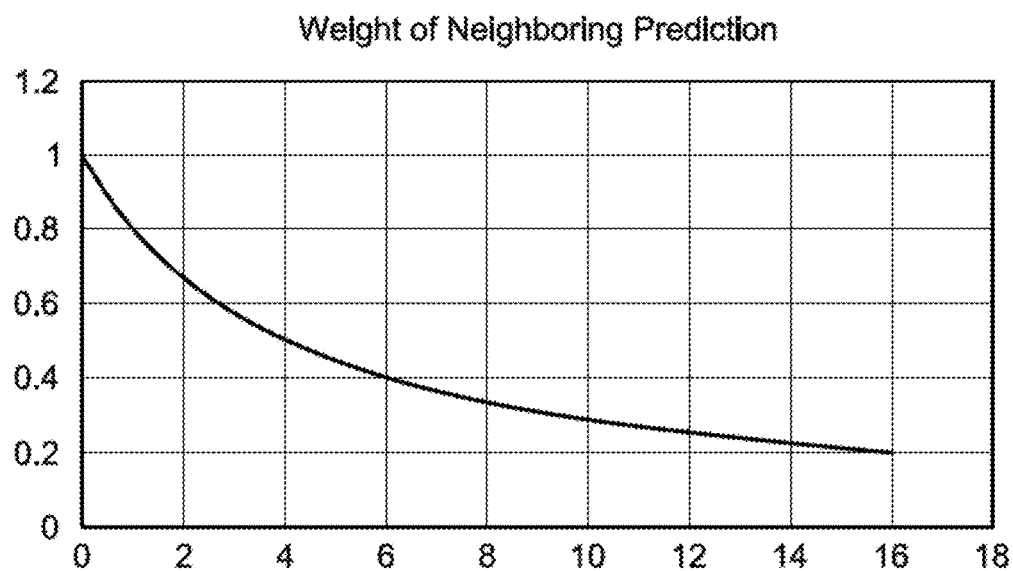
FIG. 9B also illustrates pictorially another graph of the weighting values (on Y axis) vs. pixel distance to the corresponding neighboring candidate in units of number of pixels (on X axis), according to another exemplary embodiment.

FIG. 9B illustrates pictorially the graph of the weighting values (on Y axis) vs. pixel distance to the corresponding neighbor candidate in units of number of pixels (on X axis) based on the weighting calculations according the above second exemplary embodiment.

Figure 10:
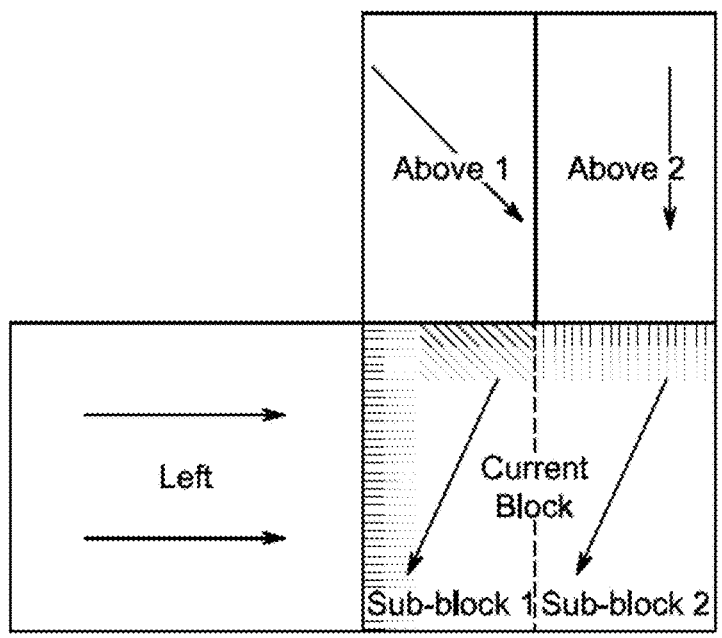
FIG. 10 illustrates blended intra prediction for a picture having sub-blocks, according to an embodiment.

In yet another non-limiting exemplary embodiment, another set of weighting calculations may be calculated as follows:

$w_0=0.5, w_1=0.3, w_2=0.1, w_k=0,$ if $k>2$ with $w_c(x,y)=1-\sum_{i \neq c} w_i(x,y)$ for the current block prediction, Additionally, exemplary aspects of the present embodiments account for the possibility of having sub-blocks either for the current block being considered and/or for the neighboring blocks being used as part of the weighted sum. In an exemplary embodiment, the prediction is performed per sub-block. The rationale is to deal with blocks where the neighbor is split along the frontier or border. As shown in FIG. 10, the current block can have several neighbors along the above block edge, each having its own prediction mode. In such a case, the prediction $P_n$ is defined by the closest neighbor, i.e., the sub-block immediately above for the top edge of the current block, or the block or sub-block immediately on the left for the left edge of the current block or sub-block. Referring again to FIG. 10, for pixels in sub-block 1 of the current block, "Above 1" block will be used as the above neighboring block, and for pixels in sub-block 2 of the current block, "Above 2" block will be used as the above neighboring block.

Note that the left edge of the sub-block 2 may not need consideration of the left neighboring sub-block, because the sub-block on the left has the same direction as sub-block 2 (indeed it is in the same block).

Figure 11:
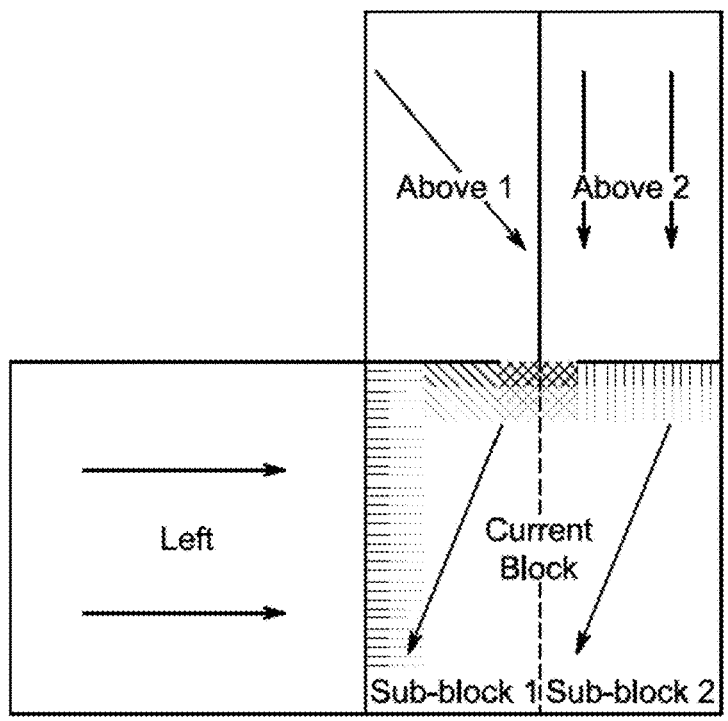
FIG. 11 also illustrates a blended intra prediction for a picture having sub-blocks, according to an embodiment.

FIG. 11 shows another exemplary embodiment which provides additional advantages to the previous embodiment shown in FIG. 10. As before, when the current block has several neighbors along one block edge, each having its own prediction mode, the blended intra prediction can be done by sub-block. However, at sub-block boundary, to avoid an abrupt change between blended intra predictions coming from different neighbors, for example, Above 1 and Above 2, these predictions also get blended close to the sub-block boundary.

In this case, a temporary prediction is built per neighboring sub-block for the entire block. For example, as in the case shown in FIG. 10, for the current block, three temporary predictions are computed with the directions of the neighbors, and one with the current block's direction. These temporary predictions are then summed together as explained above, without any change for sub-block 1. For sub-block 2, the weighting or weights are calculated as follows instead:

$$\circ\ w_i(x, y) = \max\left(\frac{1}{2} - \frac{2x}{W}, 0\right) \text{ for } i = \text{Above 1}$$

$$\circ\ w_i(x, y) = \max\left(\frac{1}{2} - \frac{2y}{H}, 0\right) \text{ for } i = \text{Above 2}$$

In yet another non-limiting exemplary embodiment, for sub-block 1, the weighting or weights may be calculated as follows instead to take into account additionally of the Above 2 neighboring block:

$$\circ\ w_i(x, y) = \max\left(\frac{1}{2} - \frac{W - 1 - 2x}{W}, 0\right) \text{ for } i = \text{Above 2}$$

$$\circ\ w_i(x, y) = \max\left(\frac{1}{2} - \frac{2y}{H}, 0\right) \text{ for } i = \text{Above 1}$$

$$\circ\ w_i(x, y) = \max\left(\frac{1}{2} - \frac{2x}{W}, 0\right) \text{ for } i = \text{Left}$$

Based on the above and as shown in FIG. 11, since the different directions of the top neighboring sub-blocks are taken into account and blended by the present blended intra prediction, the boundary between sub-block 1 and sub-block 2 at the top are now smoothed. This reduces abrupt changes between the blended predictions coming from Above 1 and Above 2 neighboring blocks at the top of current block, near the sub-block boundary.

Figure 12:
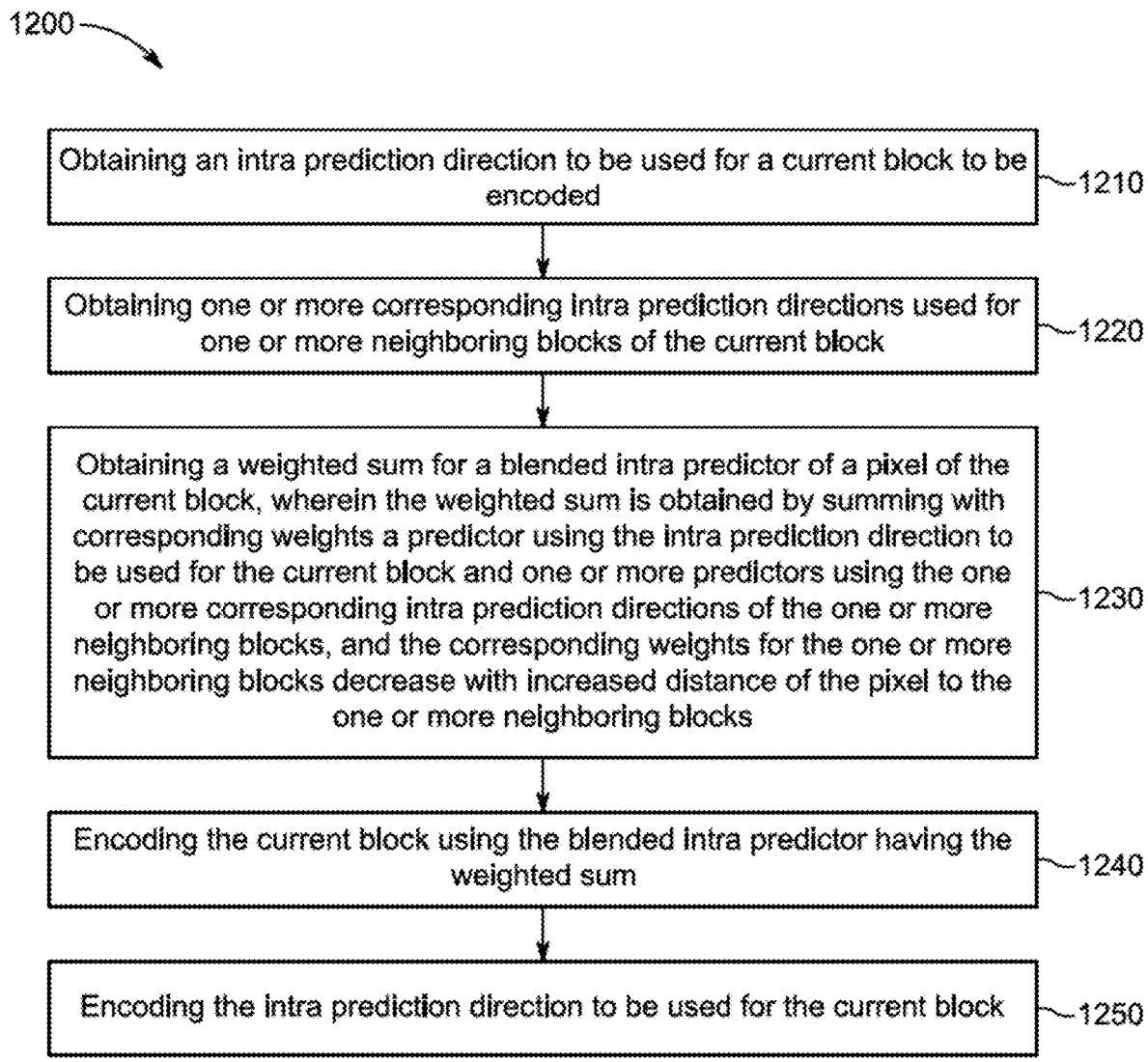
FIG. 12 illustrates an exemplary method of video encoding, according to an embodiment.

FIG. 12 illustrates an exemplary encoding method 1200 performed by an encoder (e.g., encoder 100 in FIG. 1) for encoding video data, according to an embodiment. At step 1210, the encoder determines an intra prediction direction to be used for a current block to be encoded. At step 1220, the encoder determines one or more corresponding intra prediction directions of one or more neighboring blocks of the current block. At step 1230, the encoder determine a weighted sum for a blended intra predictor of a pixel of the current block, wherein the weighted sum is determined by summing with corresponding weights a predictor using the intra prediction direction to be used for the current block and one or more predictors using the one or more corresponding intra prediction directions of the one or more neighboring blocks, and the corresponding weights for the one or more neighboring blocks decrease with increased distance of the pixel to the one or more neighboring blocks. At step 1240, the encoder encodes the current block using the blended intra predictor having the weighted sum. The intra prediction direction of the current block is also encoded at step 1250.

Figure 13:
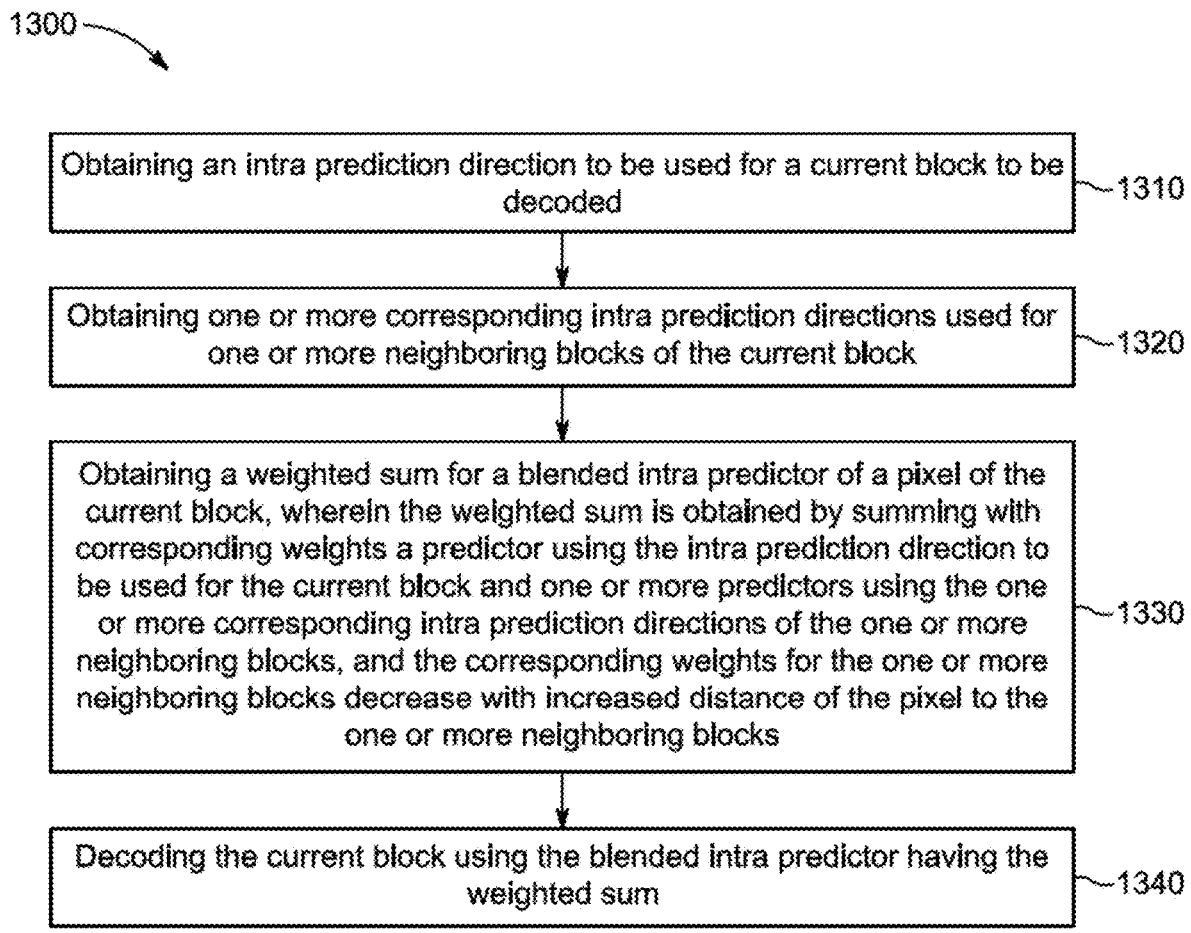
FIG. 13 illustrates an exemplary method of video decoding, according to an embodiment.

FIG. 13 illustrates an exemplary decoding method 1300 performed by a decoder (e.g., decoder 300 in FIG. 3) for decoding video data, according to an embodiment. At step 1310, the decoder determines an intra prediction direction to be used for a current block to be decoded. At step 1320, the decoder determines one or more corresponding intra prediction directions of one or more neighboring blocks of the current block. At step 1330, the decoder determines a weighted sum for a blended intra predictor of a pixel of the current block, wherein the weighted sum is determined by summing with corresponding weights a predictor using the intra prediction direction to be used for the current block and one or more predictors using the one or more corresponding intra prediction directions of the one or more neighboring blocks, and the corresponding weights for the one or more neighboring blocks decrease with increased distance of the pixel to the one or more neighboring blocks. At step 1340, the decoder decodes the current block using the blended intra predictor having the weighted sum.

As shown in FIG. 12 and FIG. 13, still only one intra prediction mode is encoded or decoded for one block for blended intra prediction. However, neighboring intra prediction directions are also used in blended intra prediction to smooth block boundary discontinuity.

Figure 14:
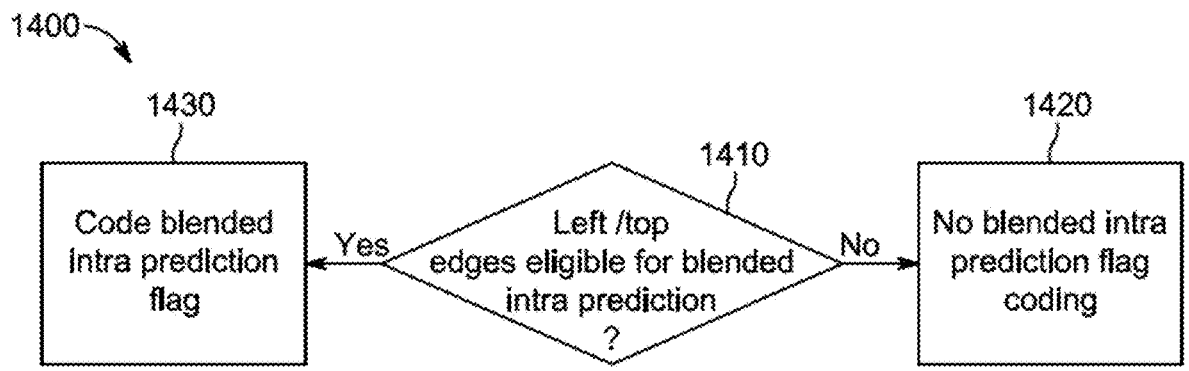
FIG. 14 illustrates another exemplary method of video encoding, according to an embodiment.

In one non-limiting exemplary embodiment, a signaling flag or syntax element is encoded at the encoder indicating the use of the blended intra prediction and sent to the decoder. FIG. 14 illustrates such an exemplary encoding method 1400 performed by an encoder. At step 1410 of FIG. 14, the encoder determines if a left and/or top edge of the current block are/is eligible for blended intra prediction. If the determination is no, then at step 1420, blended intra prediction is not used and no blended intra prediction mode flag or syntax element is needed or encoded. On the other hand, if the determination is yes, then at step 1430, blended intra prediction is used and the blended intra prediction mode flag or syntax element is encoded and sent to the decoder.

Figure 15:
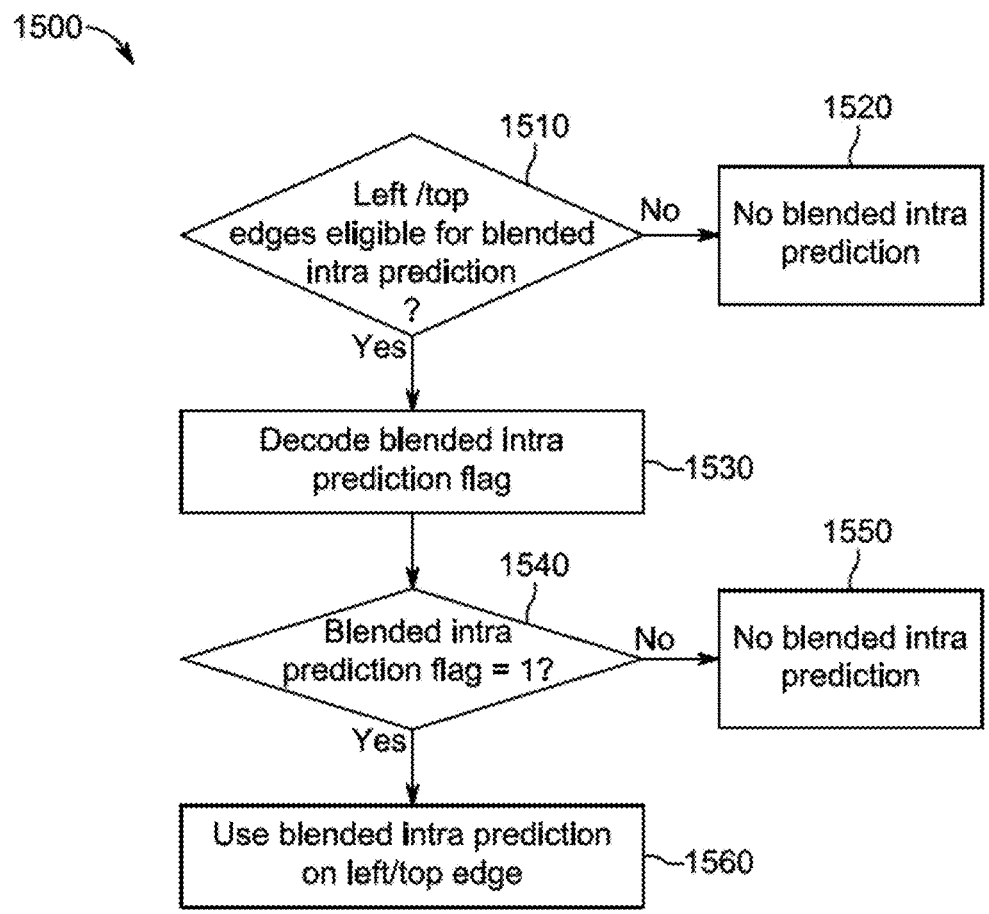
FIG. 15 illustrates an exemplary method of video decoding, according to an embodiment.

FIG. 15 illustrates an exemplary decoding method performed by a decoder. At step 1510 of FIG. 15, the decoder determines if a left and/or top edge of the current block are/is eligible, for example, there are neighboring intra prediction, for the blended intra prediction. If the determination is no, then at step 1520, blended intra prediction is not used. On the other hand, if the determination is yes, then at step 1530, the blended intra prediction flag is decoded. At step 1540, a determination is made to see if the decoded blended intra prediction flag is true (e.g., =1). If no, then no blended intra prediction is used, at step 1550. If yes, then blended intra prediction is used for the left/top edges, at step 1560.

In another non-limiting exemplary embodiment, the above described blended intra prediction mode flag or syntax element is signaled per coding unit. In another non-limiting exemplary embodiment, blended intra prediction is always used when a neighboring block or sub-block uses intra prediction and thus the dedicated signaling flag or syntax element to indicate the use of the blended Intra prediction is not needed.

In another non-limiting exemplary embodiment, blended intra prediction is only applied if the difference between the intra prediction direction for the current block and one of the one or more corresponding intra prediction directions used for the one or more neighboring blocks is greater than a threshold. In yet another non-limiting exemplary embodiment, blended Intra prediction is only applied if the height or the width of the current block is greater than a threshold. For example, blended Intra prediction is applied over an edge only when the edge is greater or equal to 8 pixels long, as defined in Table 1 below:

TABLE 1

| Block size (W × H) | Blended intra prediction use |
|---|---|
| 4 × 4 | No blended intra prediction |
| 4 × 8 | blended intra prediction on left edge only |
| 8 × 4 | Blended intra prediction on top edge only |
| 8 × 8 | Blended intra prediction on both edges |
| 16 × 4 | Blended intra prediction on top edge only |

Figure 16:
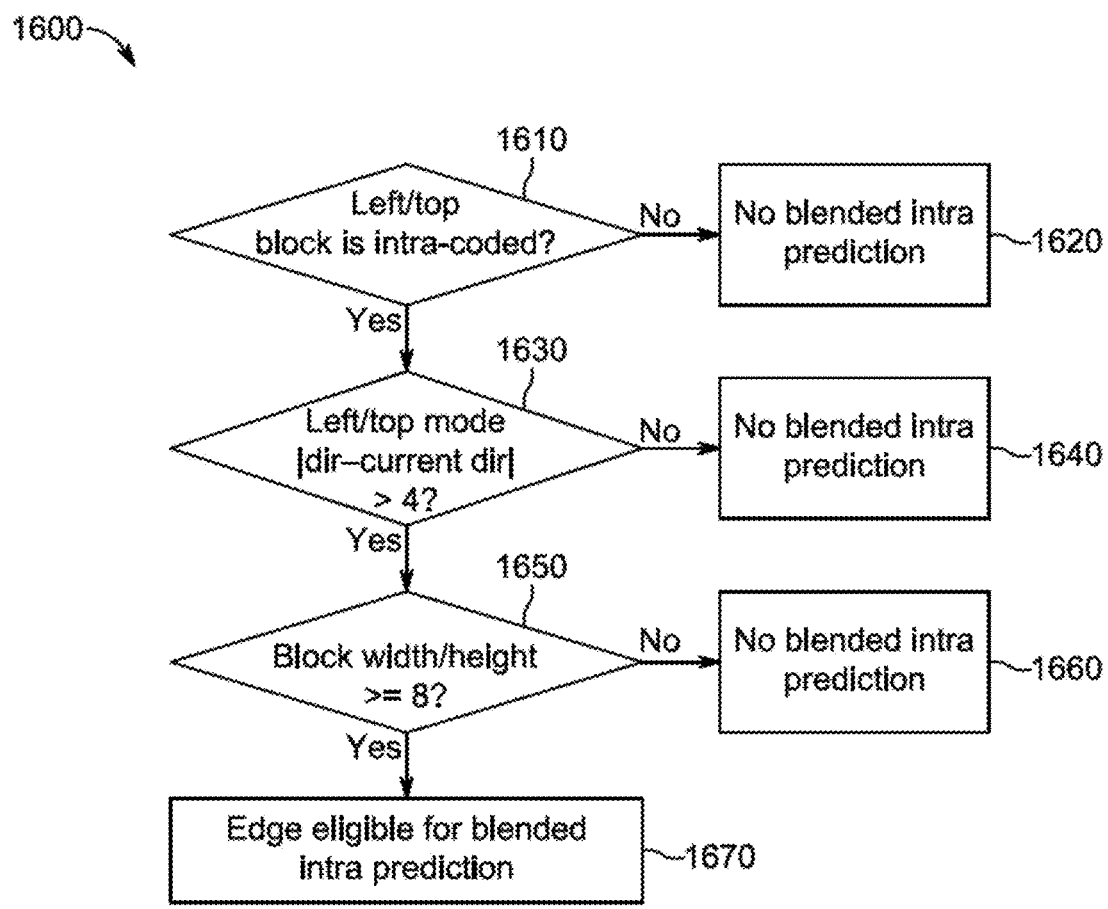
FIG. 16 illustrates an exemplary method for determining whether blended intra prediction is to be used, according to an embodiment.

FIG. 16 illustrates another exemplary method 1600 incorporating aspects of the present embodiments. Method 1600 can be used at the encoder or decoder side. At step 1610, a determination is made to see if the left and/or top neighboring block are/is intra-coded. If the determination is no, then at step 1620, blended intra prediction is not used. On the other hand, if the determination is yes, then at step 1630, another determination is made to see if the difference between the intra prediction direction for the current block and one of the one or more corresponding intra prediction directions of the one or more neighboring blocks is greater than a threshold, with the threshold being 4 directional mode difference (e.g., the difference between JEM intra prediction angular mode 7 and mode 2 would be 5 which is greater than the threshold of 4). If the determination at step 1630 is no, then at step 1640, blended intra prediction is not used. If on the other hand, the determination at step 1630 is yes, then at step 1650, another determination is made to see if the width or height of the current block is great than or equal to 8 as shown in Table 1 above. If the determination at step 1650 is no, then at step 1660, blended intra prediction is not used. If on the other hand, the determination at step 1650 is yes, then at step 1670, blended intra prediction is applied to the eligible edge of the current block.

Figure 17:
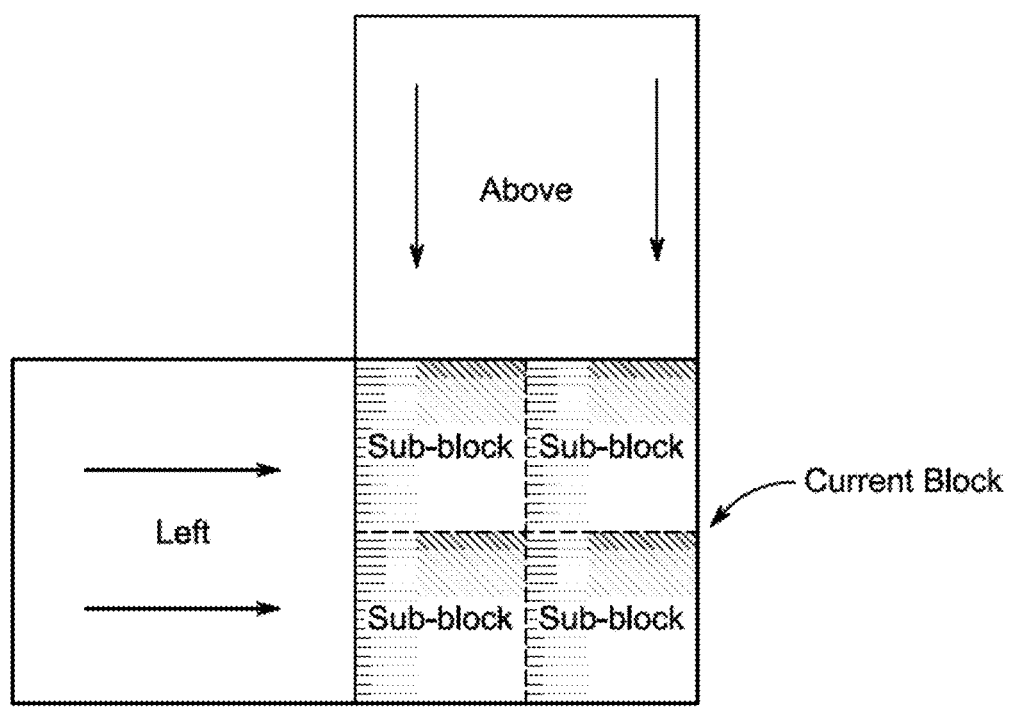
FIG. 17 illustrates blended intra prediction being applied to a block which has been sub-divided into 4 different sub-blocks, according to an embodiment.

In another non-limiting exemplary embodiment, the current block is, e.g., sub-divided into four different sub-blocks but the immediately above and left neighboring blocks are not sub-divided, as shown in FIG. 17. This embodiment is interesting when the direction of the prediction changes per sub-block inside the current block.

Accordingly, present embodiments differ from previously proposed and known Overlapped Block Intra Prediction (OBIP) in that the present embodiments provide weights for the one or more neighboring blocks which decrease with increased distance of the considered pixel to the one or more neighboring blocks. In addition, present embodiments account for the possibility of sub-blocks either for the current block being considered or its reference neighboring blocks.

Various methods are described above, and each of the methods comprises one or more steps or actions for achieving the described method. Unless a specific order of steps or actions is required for proper operation of the method, the order and/or use of specific steps and/or actions may be modified or combined.

Various methods according to the present embodiments as described above may be used to modify, e.g., the intra prediction modules (160, 360) of the JVET or HEVC encoder 100 and decoder 300 as shown in FIG. 1 and FIG. 3 respectively. Moreover, the present embodiments are not limited to JVET or HEVC, and may be applied to other standards, recommendations, and extensions thereof. Various aspects and/or embodiments described above may be used individually or in combination.

Various numeric values are used in the present application, for example, the mode difference threshold for switching on/off blended intra prediction, and the constants used in the weight calculation equations. It should be noted that the specific values are for exemplary purposes and the present embodiments are not limited to these specific values.

Figure 18:
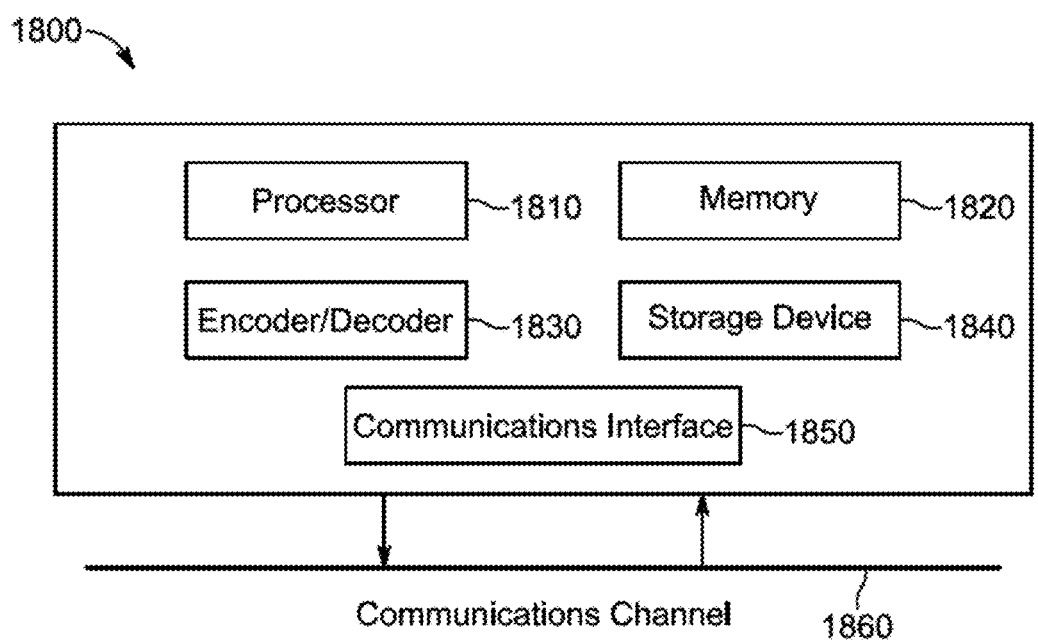
FIG. 18 illustrates a block diagram of an exemplary apparatus in which various aspects of the exemplary embodiments may be implemented.

FIG. 18 illustrates a block diagram of an exemplary system in which various aspects of the exemplary embodiments may be implemented. System 1800 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 1800 may be communicatively coupled to other similar systems, and to a display via a communication channel as shown in FIG. 18 and as known by those skilled in the art to implement the exemplary video system described above.

The system 1800 may include at least one processor 1810 configured to execute instructions loaded therein for implementing the various processes as discussed above. Processor 1810 may include embedded memory, input output interface and various other circuitries as known in the art. The system 1800 may also include at least one memory 1820 (e.g., a volatile memory device, a non-volatile memory device). System 1800 may additionally include a storage device 1820, which may include non-volatile memory, including, but not limited to, EEPROM, ROM, PROM, RAM, DRAM, SRAM, flash, magnetic disk drive, and/or optical disk drive. The storage device 1840 may comprise an internal storage device, an attached storage device and/or a network accessible storage device, as non-limiting examples. System 1800 may also include an encoder/decoder module 1830 configured to process data to provide an encoded video or decoded video.

Encoder/decoder module 1830 represents the module(s) that may be included in a device to perform the encoding and/or decoding functions. As is known, a device may include one or both of the encoding and decoding modules. Additionally, encoder/decoder module 1830 may be implemented as a separate element of system 1800 or may be incorporated within processors 1810 as a combination of hardware and software as known to those skilled in the art.

Program code to be loaded onto processors 1810 to perform the various processes described hereinabove may be stored in storage device 1840 and subsequently loaded onto memory 1820 for execution by processors 1810. In accordance with the exemplary embodiments, one or more of the processor(s) 1810, memory 1820, storage device 1840 and encoder/decoder module 1830 may store one or more of the various items during the performance of the processes discussed herein above, including, but not limited to the input video, the decoded video, the bitstream, equations, formula, matrices, variables, operations, and operational logic.

The system 1800 may also include communication interface 1850 that enables communication with other devices via communication channel 1860. The communication interface 1850 may include, but is not limited to a transceiver configured to transmit and receive data from communication channel 1860. The communication interface may include, but is not limited to, a modem or network card and the communication channel may be implemented within a wired and/or wireless medium. The various components of system 1800 may be connected or communicatively coupled together using various suitable connections, including, but not limited to internal buses, wires, and printed circuit boards.

The exemplary embodiments may be carried out by computer software implemented by the processor 1810 or by hardware, or by a combination of hardware and software. As a non-limiting example, the exemplary embodiments may be implemented by one or more integrated circuits. The memory 1820 may be of any type appropriate to the technical environment and may be implemented using any appropriate data storage technology, such as optical memory devices, magnetic memory devices, semiconductor-based memory devices, fixed memory and removable memory, as non-limiting examples. The processor 1810 may be of any type appropriate to the technical environment, and may encompass one or more of microprocessors, general purpose computers, special purpose computers and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a general aspect of at least one embodiment, a method for encoding video data is presented, comprising: determining an intra prediction direction to be used for a current block to be encoded; determining one or more corresponding intra prediction directions of one or more neighboring blocks of the current block; determining a weighted sum for a blended intra predictor of a pixel of the current block, wherein the weighted sum is determined by summing with corresponding weights a predictor using the intra prediction direction to be used for the current block and one or more predictors using the one or more corresponding intra prediction directions of the one or more neighboring blocks, and the corresponding weights for the one or more neighboring blocks decrease with increased distance of the pixel to the one or more neighboring blocks; and encoding the current block using the blended intra predictor having the weighted sum.

According to another general aspect of at least one embodiment, a method for decoding video data is presented, comprising: determining an intra prediction direction to be used for a current block to be decoded; determining one or more corresponding intra prediction directions of one or more neighboring blocks of the current block; determining a weighted sum for a blended intra predictor of a pixel of the current block, wherein the weighted sum is determined by summing with corresponding weights a predictor using the intra prediction direction to be used for the current block and one or more predictors using the one or more corresponding intra prediction directions of the one or more neighboring blocks, and the corresponding weights for the one or more neighboring blocks decrease with increased distance of the pixel to the one or more neighboring blocks; and decoding the current block using the blended intra predictor having the weighted sum.

According to another general aspect of at least one embodiment, an apparatus for encoding video data is presented, comprising at least a memory and one or more processors, wherein the one or more processors are configured to: determine an intra prediction direction to be used for a current block to be encoded; determine one or more corresponding intra prediction directions of one or more neighboring blocks of the current block; determine a weighted sum for a blended intra predictor of a pixel of the current block, wherein the weighted sum is determined by summing with corresponding weights a predictor using the intra prediction direction to be used for the current block and one or more predictors using the one or more corresponding intra prediction directions of the one or more neighboring blocks, and the corresponding weights for the one or more neighboring blocks decrease with increased distance of the pixel to the one or more neighboring blocks; and encode the current block using the blended intra predictor having the weighted sum.

According to another general aspect of at least one embodiment, an apparatus for encoding video data is presented, comprising: means for determining an intra prediction direction to be used for a current block to be encoded; means for determining one or more corresponding intra prediction directions of one or more neighboring blocks of the current block; means for determining a weighted sum for a blended intra predictor of a pixel of the current block, wherein the weighted sum is determined by summing with corresponding weights a predictor using the intra prediction direction to be used for the current block and one or more predictors using the one or more corresponding intra prediction directions of the one or more neighboring blocks, and the corresponding weights for the one or more neighboring blocks decrease with increased distance of the pixel to the one or more neighboring blocks; and means for encoding the current block using the blended intra predictor having the weighted sum.

According to another general aspect of at least one embodiment, an apparatus for decoding video data, comprising at least a memory and one or more processors, wherein the one or more processors are configured to: determine an intra prediction direction to be used for a current block to be decoded; determine one or more corresponding intra prediction directions of one or more neighboring blocks of the current block; determine a weighted sum for a blended intra predictor of a pixel of the current block, wherein the weighted sum is determined by summing with corresponding weights a predictor using the intra prediction direction to be used for the current block and one or more predictors using the one or more corresponding intra prediction directions of the one or more neighboring blocks, and the corresponding weights for the one or more neighboring blocks decrease with increased distance of the pixel to the one or more neighboring blocks; and decode the current block using the blended intra predictor having the weighted sum.

According to another general aspect of at least one embodiment, an apparatus for decoding video data, comprising: means for determining an intra prediction direction to be used for a current block to be decoded; means for determining one or more corresponding intra prediction directions of one or more neighboring blocks of the current block; means for determining a weighted sum for a blended intra predictor of a pixel of the current block, wherein the weighted sum is determined by summing with corresponding weights a predictor using the intra prediction direction to be used for the current block and one or more predictors using the one or more corresponding intra prediction directions of the one or more neighboring blocks, and the corresponding weights for the one or more neighboring blocks decrease with increased distance of the pixel to the one or more neighboring blocks; and means for decoding the current block using the blended intra predictor having the weighted sum.

According to an embodiment, the current block represents a current sub-block which has been sub-divided from a larger block and the one or more neighboring blocks represent one or more neighboring sub-blocks which have been sub-divided respectively from one or more larger neighboring blocks.

According to another embodiment, the one or more neighboring blocks comprise one or more blocks above the current block.

According to another embodiment, the one or more neighboring blocks comprise one or more blocks left of the current block.

According to another embodiment, the one or more neighboring sub-blocks comprise a neighboring sub-block immediately above the current sub-block.

According to another embodiment, the one or more neighboring sub-blocks further comprise a sub-block immediately above left of the current sub-block.

According to another embodiment, the one or more neighboring sub-blocks further comprise a sub-block immediately left of the current sub-block.

According to another embodiment, the decoding or the encoding the current block uses the blended intra predictor having the weighted sum is only applied if difference between the intra prediction direction to be used for the current block and one of the one or more corresponding intra prediction directions of the one or more neighboring blocks is greater than a threshold.

According to another embodiment, the decoding or the encoding the current block using the blended intra predictor having the weighted sum is only applied if height or width of the current block is greater than a threshold.

According to another general aspect of at least one embodiment, a bitstream is formatted to include an encoded block of video data, wherein the encoded block of video data is encoded by: determining an intra prediction direction to be used for a block of video data to be encoded; determining one or more corresponding intra prediction directions of one or more neighboring blocks of the block of video data; determining a weighted sum for a blended intra predictor of a pixel of the block of video data, wherein the weighted sum is determined by summing with corresponding weights a predictor using the intra prediction direction to be used for the block of video data and one or more predictors using the one or more corresponding intra prediction directions of the one or more neighboring blocks, and the corresponding weights for the one or more neighboring blocks decrease with increased distance of the pixel to the one or more neighboring blocks; and encoding the block of video data using the blended intra predictor having the weighted sum.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for encoding video data, comprising:
   obtaining an intra prediction direction for a current block to be encoded;
   obtaining one or more corresponding intra prediction directions of one or more neighboring blocks of the current block;
   obtaining a weighted sum for a blended intra predictor of a pixel of the current block, wherein the weighted sum is obtained by summing with corresponding weights (1) a predictor using the intra prediction direction for the current block and (2) one or more predictors using the one or more corresponding intra prediction directions of the one or more neighboring blocks, and the corresponding weights for the one or more neighboring blocks decrease with increased distance of the pixel to the one or more neighboring blocks;
   encoding the current block using the blended intra predictor having the weighted sum, wherein the encoding the current block using the blended intra predictor having the weighted sum is only applied responsive to height or width of the current block is greater than a threshold of N samples, wherein N is an integer and N>0; and
   encoding the intra prediction direction for the current block.

2. The method of claim 1, wherein the current block represents a current sub-block which has been sub-divided from a larger block.

3. The method of claim 1, wherein the one or more neighboring blocks represent one or more neighboring sub-blocks which have been sub-divided respectively from one or more larger neighboring blocks.

4. The method of claim 1, wherein the encoding the current block using the blended intra predictor having the weighted sum is only applied responsive to difference between the intra prediction direction for the current block and one of the one or more corresponding intra prediction directions of the one or more neighboring blocks is greater than a threshold of M, wherein M is an integer and M>0.

5. The method of claim 1, wherein N=8.

6. A method for decoding video data, comprising:
   obtaining an intra prediction direction for a current block to be decoded;
   obtaining one or more corresponding intra prediction directions of one or more neighboring blocks of the current block;
   obtaining a weighted sum for a blended intra predictor of a pixel of the current block,
   wherein the weighted sum is obtained by summing with corresponding weights (1) a predictor using the intra prediction direction for the current block and (2) one or more predictors using the one or more corresponding intra prediction directions of the one or more neighboring blocks, and the corresponding weights for the one or more neighboring blocks decrease with increased distance of the pixel to the one or more neighboring blocks; and
   decoding the current block using the blended intra predictor having the weighted sum, wherein the decoding the current block using the blended intra predictor having the weighted sum is only applied responsive to height or width of the current block is greater than a threshold of N samples, wherein N is an integer and N>0.

7. The method of claim 6, wherein the current block represents a current sub-block which has been sub-divided from a larger block.

8. The method of claim 6, wherein the one or more neighboring blocks represent one or more neighboring sub-blocks which have been sub-divided respectively from one or more larger neighboring blocks.

9. The method of claim 6, wherein the decoding the current block using the blended intra predictor having the weighted sum is only applied responsive to difference between the intra prediction direction for the current block and one of the one or more corresponding intra prediction directions of the one or more neighboring blocks is greater than a threshold of M, wherein M is an integer and M>0.

10. The method of claim 6, wherein N=8.

11. An apparatus for encoding video data, comprising one or more processors, wherein the one or more processors are configured to:
   obtain an intra prediction direction for a current block to be encoded;
   obtain one or more corresponding intra prediction directions of one or more neighboring blocks of the current block;

obtain a weighted sum for a blended intra predictor of a pixel of the current block, wherein the weighted sum is obtained by summing with corresponding weights (1) a predictor using the intra prediction direction for the current block and (2) one or more predictors using the one or more corresponding intra prediction directions of the one or more neighboring blocks, and the corresponding weights for the one or more neighboring blocks decrease with increased distance of the pixel to the one or more neighboring blocks;

encode the current block using the blended intra predictor having the weighted sum, wherein encoding the current block using the blended intra predictor having the weighted sum is only applied responsive to height or width of the current block is greater than a threshold of N samples, wherein N is an integer and N>0; and encode the intra prediction direction for the current block.

12. The apparatus of claim 11, wherein the current block represents a current sub-block which has been sub-divided from a larger block.

13. The apparatus of claim 11, wherein the one or more neighboring blocks represent one or more neighboring sub-blocks which have been sub-divided respectively from one or more larger neighboring blocks.

14. The apparatus of claim 11, wherein the encoding the current block using the blended intra predictor having the weighted sum is only applied responsive to difference between the intra prediction direction for the current block and one of the one or more corresponding intra prediction directions of the one or more neighboring blocks is greater than a threshold of M, wherein M is an integer and M>0.

15. The apparatus of claim 11, wherein N=8.

16. An apparatus for decoding video data, comprising one or more processors, wherein the one or more processors are configured to:

obtain an intra prediction direction for a current block to be decoded;

obtain one or more corresponding intra prediction directions of one or more neighboring blocks of the current block;

obtain a weighted sum for a blended intra predictor of a pixel of the current block, wherein the weighted sum is obtained by summing with corresponding weights (1) a predictor using the intra prediction direction for the current block and (2) one or more predictors using the one or more corresponding intra prediction directions of the one or more neighboring blocks, and the corresponding weights for the one or more neighboring blocks decrease with increased distance of the pixel to the one or more neighboring blocks; and decode the current block using the blended intra predictor having the weighted sum, wherein decoding the current block using the blended intra predictor having the weighted sum is only applied responsive to height or width of the current block is greater than a threshold of N samples, wherein N is an integer and N>0.

17. The apparatus of claim 16, wherein the current block represents a current sub-block which has been sub-divided from a larger block.

18. The apparatus of claim 16, wherein the one or more neighboring blocks represent one or more neighboring sub-blocks which have been sub-divided respectively from one or more larger neighboring blocks.

19. The apparatus of claim 16, wherein the decoding the current block using the blended intra predictor having the weighted sum is only applied responsive to difference between the intra prediction direction for the current block and one of the one or more corresponding intra prediction directions of the one or more neighboring blocks is greater than a threshold of M, wherein M is an integer and M>0.

20. The apparatus of claim 16, wherein N=8.

* * * * *